(12) United States Patent
Hsu

(10) Patent No.: US 7,979,053 B2
(45) Date of Patent: Jul. 12, 2011

(54) SECURITY SYSTEM AND METHOD FOR A MOBILE PHONE

(75) Inventor: Po-Chun Hsu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 429 days.

(21) Appl. No.: 12/198,877

(22) Filed: Aug. 26, 2008

(65) Prior Publication Data

US 2009/0098856 A1 Apr. 16, 2009

(30) Foreign Application Priority Data

Oct. 12, 2007 (CN) .............................. 2007 1 202051

(51) Int. Cl.
*H04M 1/66* (2006.01)
(52) U.S. Cl. ..... 455/410; 455/418; 455/463; 455/550.1; 726/2; 340/5.8
(58) Field of Classification Search .................. 455/410, 455/411, 550.1, 463
See application file for complete search history.

(56) References Cited

U.S. PATENT DOCUMENTS

| 7,746,994 B1* | 6/2010 | Sanchez ................. 379/201.01 |
| 2005/0107114 A1* | 5/2005 | Ocock ........................ 455/550.1 |
| 2005/0116840 A1* | 6/2005 | Simelius ........................ 341/22 |

FOREIGN PATENT DOCUMENTS

CN 101035335 A 9/2007

* cited by examiner

*Primary Examiner* — Kamran Afshar
*Assistant Examiner* — Vladimir Magloire
(74) *Attorney, Agent, or Firm* — Frank R. Niranjan

(57) ABSTRACT

A security system for a mobile phone is disclosed for securing private information of the mobile phone. The system may set at least two PIN numbers for a super user and a general user, encrypt a phone book system of the mobile phone by setting a security status for each contact in a phone book system of the mobile phone. The system also may start a secure work mode if a user of the mobile phone is a super user and starting a non-secure work mode if the user is a general user of the mobile phone. A security method for a mobile phone is also disclosed.

4 Claims, 6 Drawing Sheets

| ID name | Address | Phone number | ... | Security status |
|---|---|---|---|---|
| Peter | Shenzhen | 135432546 | ... | Yes |
| Alex | Shanghai | 1365422021 | ... | No |
| Julian | Beijing | 135425250 | ... | No |
| ... | ... | ... | ... | ... |
| Tom | Shenzhen | 85421360 | ... | Yes |

FIG. 6

SECURITY SYSTEM AND METHOD FOR A MOBILE PHONE

BACKGROUND

1. Field of the Invention

Embodiments of the present disclosure relates to security systems and methods, and particularly to a security system and method for a mobile phone.

2. Description of Related Art

Currently, mobile phones have many advanced functions including advanced auxiliary functions. The auxiliary functionality of a mobile phone typically includes such things as phone book systems, ring tones, network settings, short message services, and security features.

A popular security function of mobile phones is a personal identification numbers (PIN). A user has a PIN number that can be used to lock or unlock the mobile phone as a means for securing the mobile phone. Inputting a pin number is usually performed by the user manually keying in the PIN on a keypad of the mobile phone. However, if the mobile phone is borrowed by others to use temporarily, there is nothing that can be done to prevent unauthorized access to private information on the mobile phone.

What is needed, therefore, is a system and method for securing the mobile phone when multiple people use the mobile phone.

SUMMARY

In one aspect, the aforementioned needs are satisfied by a security system for a mobile phone. The system comprises: a PIN number setting module configured for setting at least two PIN numbers for at least two users of the mobile phone, wherein the at least two PIN numbers comprises a first PIN number for a super user and a second PIN number for a general user of the mobile phone; an encrypting module configured for encrypting the phone book system of the mobile phone by setting a security status for each contact in the phone book system; an unlocking module configured for receiving a PIN number inputted by a user, and unlocking a keypad of the mobile phone if the inputted PIN number corresponds to one of the at least two PIN numbers; a work starting module configured for determining if the user is either a super user or a general user of the mobile phone according to the inputted PIN number, and for starting a secure work mode if the user is the super user, and for starting a non-secure work mode if the user is the general user of the mobile phone.

Other objects, advantages and novel features will become more apparent from the following detailed description of certain embodiments of the present disclosure when taken in conjunction with the accompanying drawings, in which:

BRIEF DESCRIPTION OF THE DRAWINGS

FIG. 6 illustrates a schematic interface of an encrypted phone book system.

DETAILED DESCRIPTION OF CERTAIN INVENTIVE EMBODIMENTS

Figure 1:
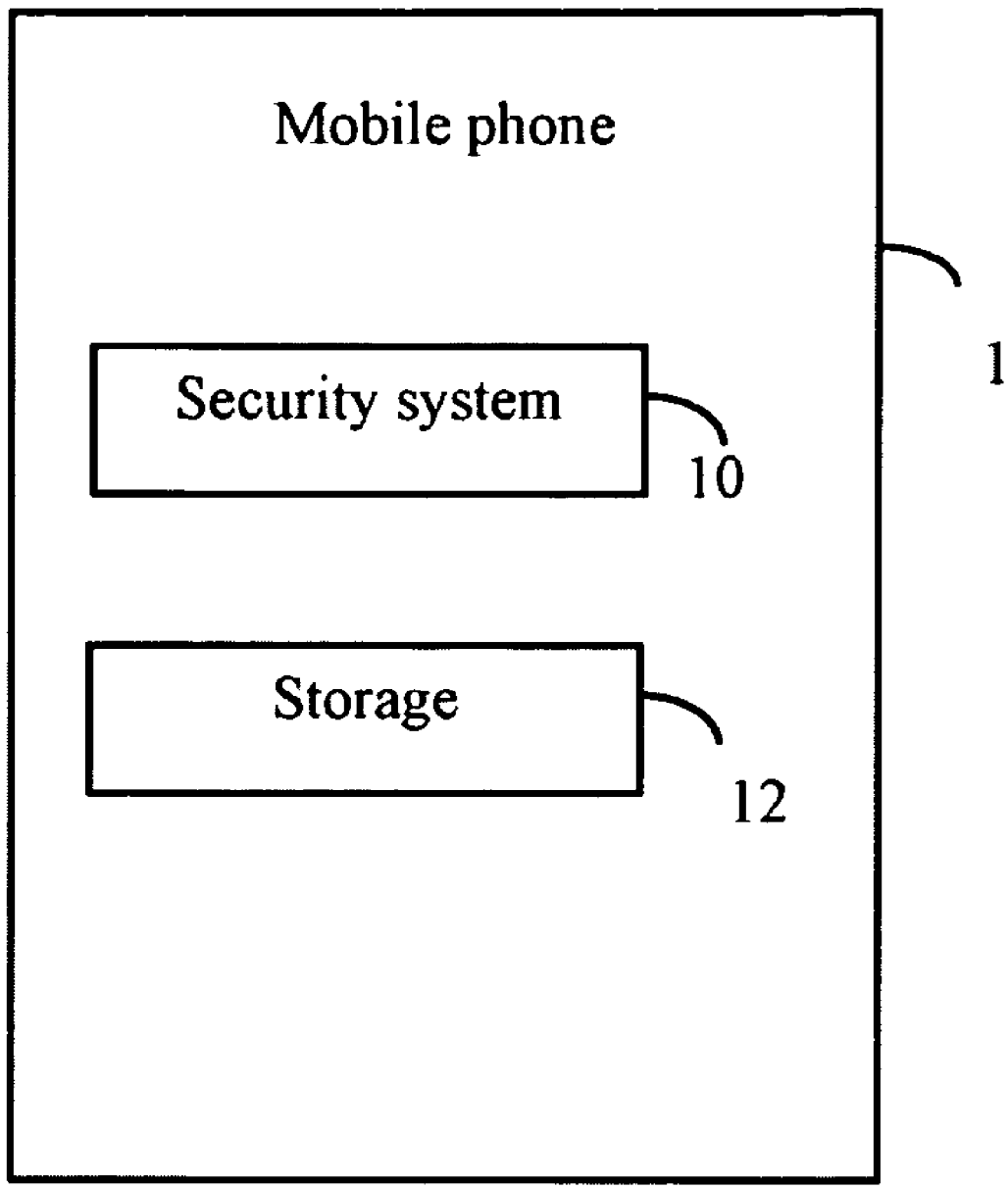
FIG. 1 is a block diagram of one embodiment a mobile phone comprising a security system.

FIG. 1 is a block diagram of one embodiment a mobile phone 1 comprising a security system 10. The security system 10 is configured for setting security measurements for the mobile phone 1. The security measurements, in one embodiment comprises setting least two PIN numbers, encrypting an electronic phone book system (shown in FIG. 6) of the mobile phone 1, setting a security status for each contact in the phone book system, and starting a secure work mode of the mobile phone 1. Further details of these security measurements will be explained in further detail herein.

The encrypted phone book system includes information about an identification (ID) name, address, phone number(s), and security status for each contact in the phone book system. For example, in FIG. 6, a contact has an ID name "Peter," an address "Shenzhen," a phone number "135432546," and a security status "yes." In other words, a call and a message from Peter may be placed and/or sent as a secured call and a secured message, respectively.

The mobile phone 1 also includes a storage 12 for storing data used or generated using the security system 10, such as the phone book system, messages received and/or sent, call history of the mobile phone 1, the PIN numbers of one or more users of the mobile phone 1.

Figure 2:
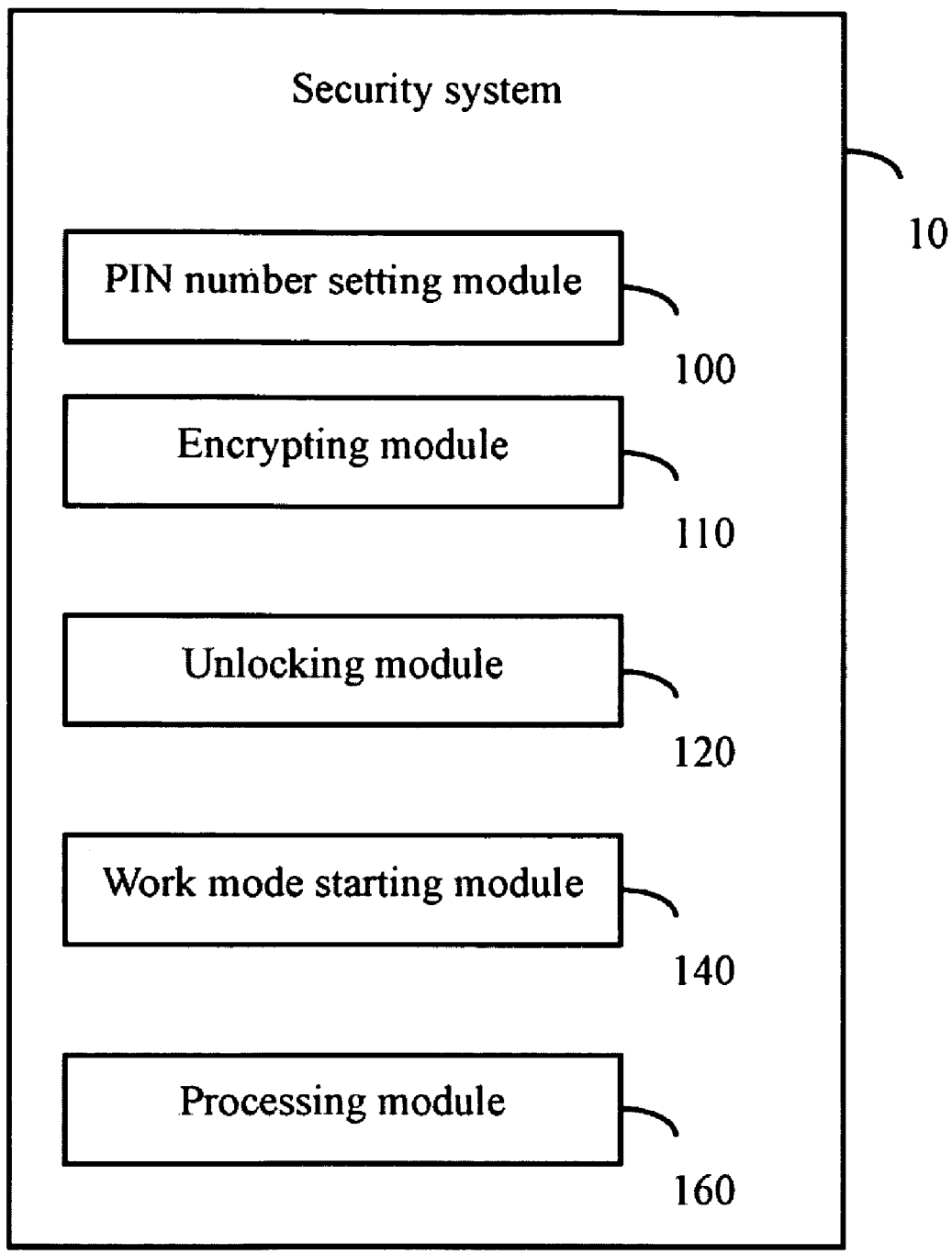
FIG. 2 is a block diagram of function modules of the security system.

FIG. 2 is a block diagram of function modules of the security system 10. The security system 10 includes a PIN number setting module 100, an encrypting module 110, an unlocking module 120, a work mode starting module 140, and a processing module 160. The modules 100, 110, 120, 140, 160 may be used to execute one or more operations of the mobile phone 1. Accordingly, one or more processors may be used to receive data and execute one or more operations for the modules 100, 110, 120, 140, 160.

The PIN number setting module 100 is configured for setting at least two PIN numbers for one or more users of the mobile phone 1. In one embodiment, a super user and a general user for the mobile phone 1 may be defined. The super user may be defined as a user having administrative access to the mobile phone 1, such as deleting and/or adding contacts, and general operation of the mobile phone 1, such as unlocking the keypad of the mobile phone. The general user may be defined a user who may be given limited access to the mobile phone 1 and not to edit data on the mobile phone 1. The limited access may include allowing the general user to unlock a keypad of the mobile phone 1. The PIN number for the general user may be defaulted to be displayed on the screen of mobile phone 1 when the keypad are locked in one embodiment of the present disclosure. In one embodiment, a mother may be the super user and her son may be the general user. It may be understood that multiple super users and general uses may be defined by the PIN number setting module 100.

The encrypting module 110 is configured for encrypting the phone book system of the mobile phone 1 by setting a security status for each contact in the phone book system. For example, the encrypting module 110 encrypts the phone book system illustrated in FIG. 6 by setting the security status of "Peter" and "Tom" to be "yes," and setting the security status of "Alex" and "Julian" to be "no." For example, a call from "Peter" or "Tom" may be placed securely and a message from "Peter" or "Tom" may be placed securely. On the other hand, the call from "Alex" and "Julian" may not be placed securely, and the message from "Alex" and "Julian" may not be placed securely. As used herein, the term, "placed securely" is defined as placing and/or receiving a call and/or a message from a user.

The unlocking module 120 is configured for receiving a PIN number inputted by a user, and unlocking the keypad if the inputted PIN number corresponds to one of two preset PIN numbers of the super user and the general user.

The work mode starting module 140 is configured for determining if a user who has inputted a PIN number into the mobile phone 1 is either the super user or the general user according to the inputted PIN number. The work mode starting module 140 is further configured for starting a secure work mode if the user is the super user and starting a non-secure work mode if the user is the general user. With reference to FIG. 6, it may be understood that when the mobile phone 1 is under the non-secure work mode, a general user of the mobile phone 1 cannot access any information of Peter stored in the encrypted phone book system, and cannot access messages sent from Peter. The general user can only see the phone number 135432546 on a screen of the mobile phone 1 when there is a call from Peter.

The processing module 160 is configured for displaying information about an incoming call. The information of an incoming call may comprise an ID name of an incoming call (e.g., a name of a person corresponding to a phone number) or displaying only a phone number of the incoming call on the screen of the mobile phone 1 when the mobile phone 1 receives the incoming call. The procedure of processing the received incoming call is detailed described in FIG. 4. Furthermore, the processing module 160 is configured for displaying a notification on a display of the mobile phone upon receiving a message for a super user of the mobile phone 1. If a general user is currently using the mobile phone, the processing module 160 may hiding the message directly when the mobile phone 1 receives the message such that the general user cannot access the received message. The procedure of processing the received message is detailed described in FIG. 5.

Figure 3:
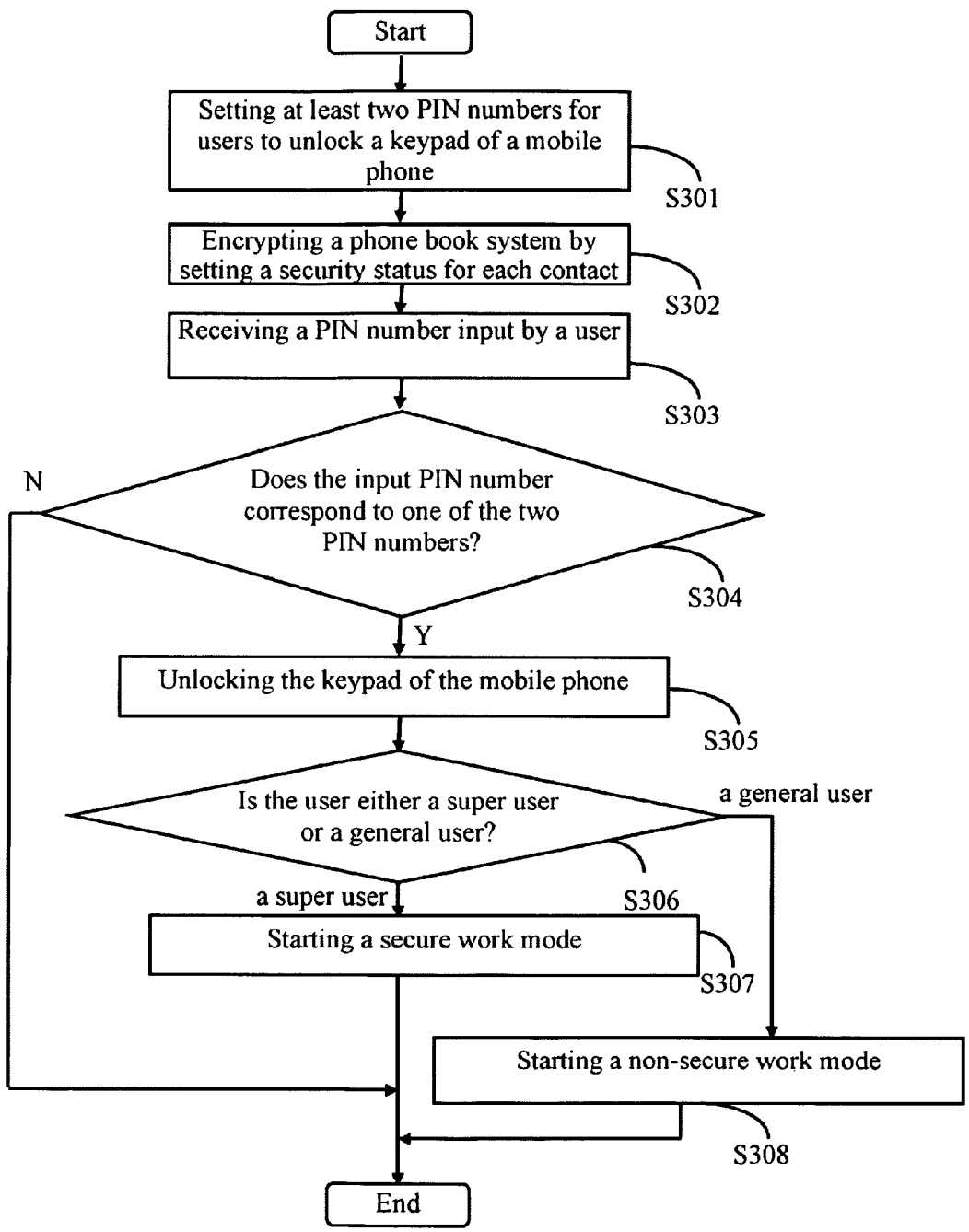
FIG. 3 is a flowchart of one embodiment of a method for securing the mobile phone using the security system of the present disclosure.

FIG. 3 is a flowchart of one embodiment of a method for securing the mobile phone 1 using the security system 10 of the present disclosure. Depending on the embodiment, additional blocks may be added, others deleted, and the ordering of the blocks may be changed. In block S301, the PIN number setting module 100 sets at least two PIN numbers for a super user and a general user of the mobile phone 1. Generally, the PIN number for the general user may be defaulted to be displayed on the screen of mobile phone 1 when the keypad is locked.

In block S302, the encrypting module 110 encrypts the phone book system of the mobile phone 1 by setting a security status for each contact in the phone book system. Details of one example of setting security statuses for one or more users of the mobile phone 1 is detailed above.

In block S303, the mobile phone 1 receives a PIN number inputted by a user via a keypad of the mobile phone 1 or by other means. In block S304, the unlocking module 120 determines if the inputted PIN number corresponds to one of two preset PIN numbers.

In block S305, the unlocking module 120 unlocks the keypad of the mobile phone 1 if the input PIN number corresponds to one of the two preset PIN numbers. In block S306, the work mode starting module 140 determines if the user is a super user or a general user of the mobile phone 1 according to the inputted PIN number.

In block S307, the work mode starting module 140 starts the secure work mode if the user is a super user. On the other hand, in block S308, the work mode starting module 140 starts the non-secure work mode if the user is a general user.

Figure 4:
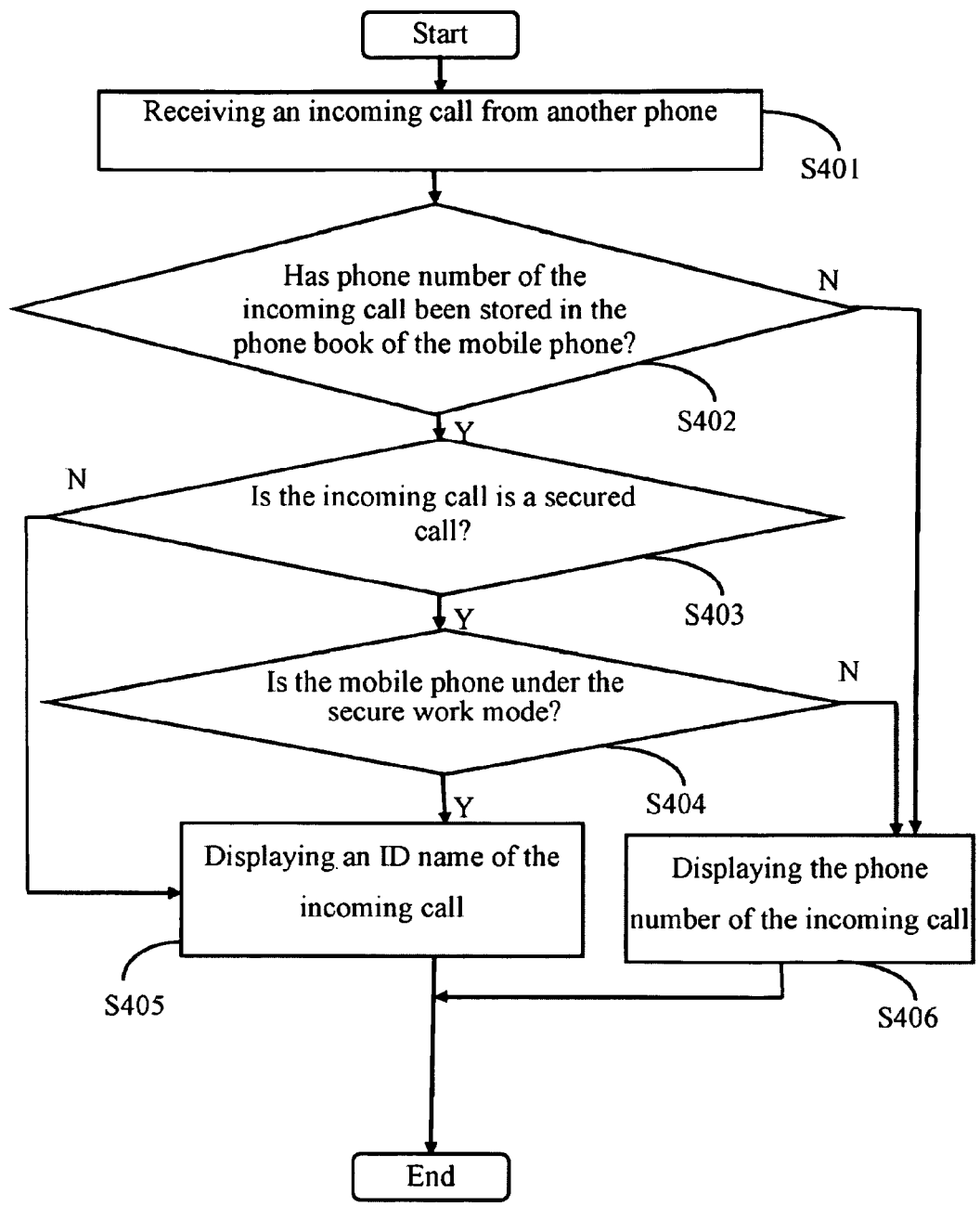
FIG. 4 is a flowchart illustrating one embodiment of a method for processing an incoming call from another phone using the mobile phone of the present disclosure.

FIG. 4 is a flowchart of one embodiment of a method for processing an incoming call from another phone using the mobile phone 1 of the present disclosure. In block S401, the mobile phone 1 receives an incoming call from another phone. In block S402, the processing module 160 determines if the phone number of the incoming call has been stored previously in the phone book system illustrated in FIG. 6 of the mobile phone 1. If the phone number has been stored previously in the phone book system, in block S403, the processing module 160 determines if the incoming call is a secured call by checking the security status of the contact making the call. In block S404, the processing module 160 determines if the mobile phone 1 is under the secure work mode if the incoming call is a secured call. If the mobile phone 1 is under the secure work mode, in block S405, the processing module 160 displays the ID name of the incoming call on the screen of the mobile phone 1. Otherwise, if the mobile phone 1 is under the non-secure work mode, in block S406, the processing module 160 displays only the phone number of the incoming call on the screen.

In block S402, if the phone number of the incoming call has not been stored in the phone book system of the mobile phone 1, the procedure goes to block S406.

In block S403, if the incoming call is not a secured call, the procedure goes to block S405.

Figure 5:
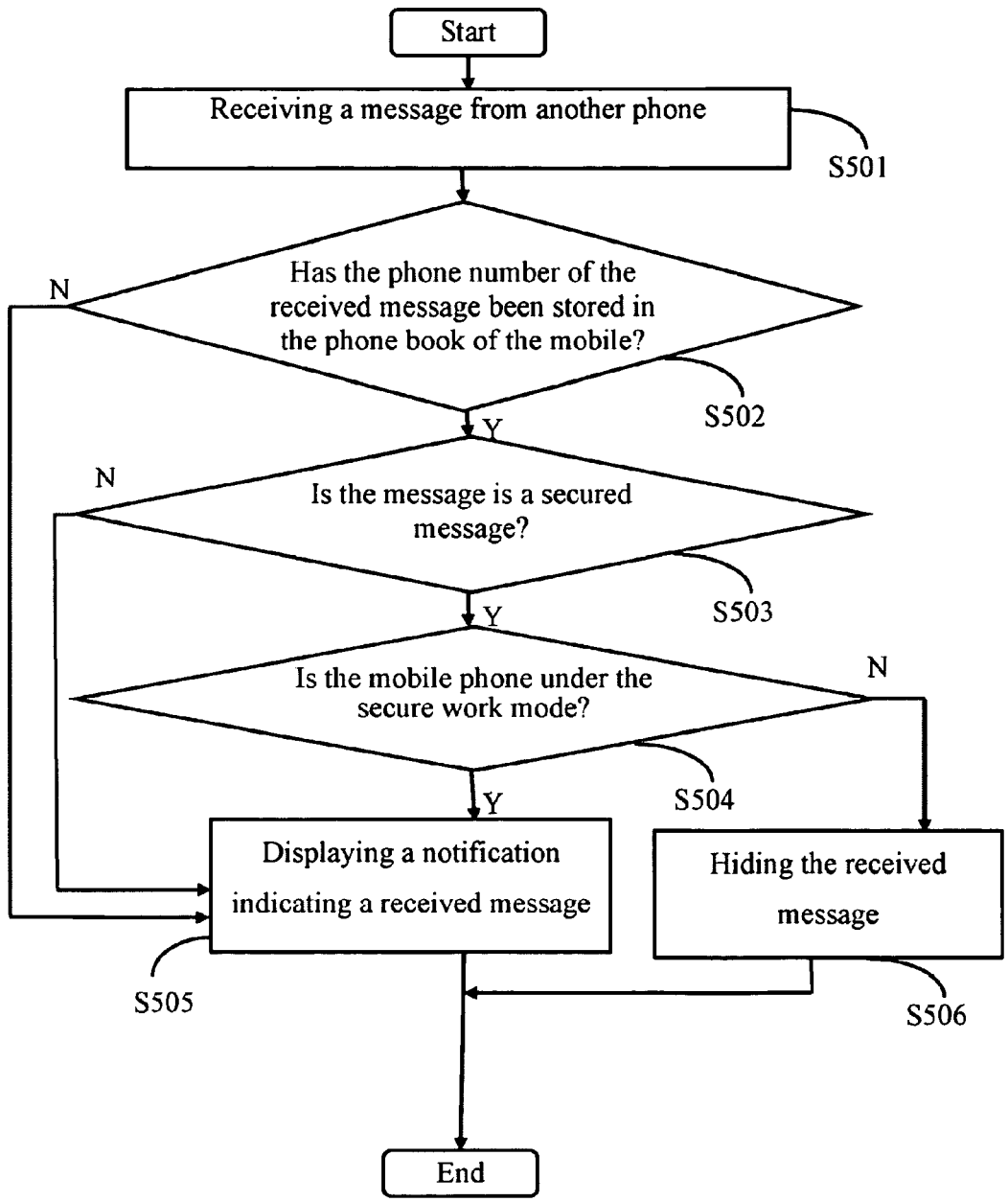
FIG. 5 is a flowchart illustrating one embodiment of a method for processing a message from another phone.

FIG. 5 is a flowchart of one embodiment of a method for processing a message from another phone using the mobile phone 1 of the present disclosure. In block S501, the mobile phone 1 receives the message from another phone. In block S502, the processing module 160 determines if the phone numbers of the received message has been stored previously in the phone book system of the mobile phone 1. If the phone number has been stored previously in the phone book system, in block S503, the processing module 160 determines if the received message is a secured message. In block S504, the processing module 160 determines if the mobile phone 1 is under the secure work mode if the message is a secured message. If the mobile phone 1 is under the secure work mode, in block S505, the processing module 160 displays a notification indicating a received message on the screen of the mobile phone 1. Otherwise, if the mobile phone 1 is under the non-secure work mode, in block S506, the processing module 160 hides the received message directly.

In block S502, if the phone number of the received message has not been stored in the phone book system of the mobile phone 1, the procedure goes to block S505.

In block S503, if the received message is not a secured message, the procedure goes to block S505.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented security method for a mobile phone, comprising:
   (a) setting at least two PIN numbers for at least two users of the mobile phone, wherein the at least two PIN numbers comprises a first PIN number for a super user and a second PIN number for a general user of the mobile phone;
   (b) encrypting a phone book system of the mobile phone by setting a security status for each contact in the phone book system of the mobile phone;

(c) receiving a PIN number inputted by a user, and unlocking a keypad of the mobile phone if the inputted PIN number corresponds to one of the at least two PIN numbers;

(d) determining if the user is the super user or the general user according to the inputted PIN number;

(e) starting a secure work mode of the mobile phone if the user is the super user, and starting a non-secure work mode of the mobile phone if the user is the general user;

(f) receiving an incoming call sent from another phone;

(g) determining if a phone number of the incoming call has been stored previously in the phone book system of the mobile phone, and going to step (h) upon the condition that the phone number of the incoming call have been stored in the phone book system, and going to step (j2) upon the condition that the phone number of the incoming call has not been stored in the phone book system;

(h) determining if the incoming call is a secured call upon the condition that the phone number of the incoming call has been stored in the phone book system, going to step (i) upon the condition that the incoming call is the secured call, and going to step (j1) upon the condition that the incoming call is not the secured call;

(i) determining if the mobile phone is under the secure work mode upon the condition that the incoming call is a secured call, going to step (j1) upon the condition that the mobile phone is under the secure work mode, and going to step (j2) upon the condition that the mobile phone is not under the secure work mode;

(j1) displaying an ID name of the incoming call on a screen of the mobile phone; and (j2) displaying the phone number of the incoming call on the screen of the mobile phone.

2. The method as claimed in claim 1, further comprising:

(k) receiving a message sent from another phone;

(l) determining if the phone number of the received message has been stored previously in the phone book system of the mobile phone, going to step (m) upon the condition that the phone number of the received message has been stored in the phone book system, and going to step (p1) upon the condition that the phone number of the received message has not been stored in the phone book system;

(m) determining if the message is a secured message upon the condition that the phone number of the received message has been stored in the phone book system, going to step (n) if the message is the secured message, and going to step (p1) if the message is not the secured message;

(n) determining if the mobile phone is under the secure work mode upon the condition that the message is in the secured message, going to step (p1) upon the condition that the mobile phone is under the secure work mode, and going to step (p2) upon the condition that the mobile phone is not under the secure work mode;

(p1) displaying a notification indicating a received message on the screen of the mobile phone; and (p2) hiding the received message directly.

3. A storage medium having stored thereon instructions that, when executed by a mobile phone, causing the mobile phone to perform a security method comprising:

(a) setting at least two PIN numbers for at least two users of the mobile phone, wherein the at least two PIN numbers comprises a first PIN number for a super user and a second PIN number for a general user of the mobile phone;

(b) encrypting a phone book system of the mobile phone by setting a security status for each contact in the phone book system of the mobile phone;

(c) receiving a PIN number inputted by a user, and unlocking a keypad of the mobile phone if the inputted PIN number corresponds to one of the at least two PIN numbers;

(d) determining if the user is the super user or the general user according to the inputted PIN number;

(e) starting a secure work mode of the mobile phone if the user is the super user, and starting a non-secure work mode of the mobile phone if the user is the general user (f) receiving an incoming call sent from another phone;

(g) determining if a phone number of the incoming call has been stored previously in the phone book system of the mobile phone, and going to step (h) upon the condition that the phone number of the incoming call have been stored in the phone book system, and going to step (j2) upon the condition that the phone number of the incoming call has not been stored in the phone book system;

(h) determining if the incoming call is a secured call upon the condition that the phone number of the incoming call has been stored in the phone book system, going to step (i) upon the condition that the incoming call is the secured call, and going to step (j1) upon the condition that the incoming call is not the secured call;

(i) determining if the mobile phone is under the secure work mode upon the condition that the incoming call is a secured call, going to step (j1) upon the condition that the mobile phone is under the secure work mode, and going to step (j2) upon the condition that the mobile phone is not under the secure work mode;

(j1) displaying an ID name of the incoming call on a screen of the mobile phone; and (j2) displaying the phone number of the incoming call on the screen of the mobile phone.

4. The storage medium as claimed in claim 3, wherein the method further comprises:

(k) receiving a message sent from another phone;

(l) determining if a phone number of the received message has been stored previously in the phone book system of the mobile phone, going to step (m) upon the condition that the phone number of the received message has been stored in the phone book system, and going to step (p1) upon the condition that the phone number of the received message are has not been stored in the phone book system;

(m) determining if the message is a secured message upon the condition that the phone number of the received message has been stored in the phone book system, going to step (n) if the message is the secured message, and going to step (p1) if the message is not the secured message;

(n) determining if the mobile phone is under the secure work mode upon the condition that the message is in the secured message, going to step (p1) upon the condition that the mobile phone is under the secure work mode, and going to step (p2) upon the condition that the mobile phone is not under the secure work mode;

(p1) displaying a notification indicating a received message on the screen of the mobile phone; and (p2) hiding the received message directly.

* * * * *